United States Patent
Wang et al.

(10) Patent No.: US 10,942,828 B2
(45) Date of Patent: Mar. 9, 2021

(54) METHOD FOR STORING DATA SHARDS, APPARATUS, AND SYSTEM

(71) Applicant: HUAWEI TECHNOLOGIES CO., LTD., Guangdong (CN)

(72) Inventors: Huaqiong Wang, Shenzhen (CN); Chao Gao, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/270,048

(22) Filed: Feb. 7, 2019

(65) Prior Publication Data
US 2019/0171537 A1    Jun. 6, 2019

Related U.S. Application Data

(63) Continuation of application No. PCT/CN2017/079971, filed on Apr. 10, 2017.

(30) Foreign Application Priority Data

Aug. 10, 2016   (CN) .......................... 201610659118.4

(51) Int. Cl.
*G06F 11/20*    (2006.01)
*H04L 29/08*    (2006.01)

(52) U.S. Cl.
CPC ...... *G06F 11/2094* (2013.01); *G06F 11/2082* (2013.01); *H04L 29/08* (2013.01); *H04L 67/1097* (2013.01)

(58) Field of Classification Search
CPC .. G06F 11/2082; G06F 11/2094; H04L 29/08; H04L 41/0654; H04L 67/1002; H04L 67/1097
See application file for complete search history.

(56) References Cited

U.S. PATENT DOCUMENTS

| 5,555,404 A | 9/1996 | Torbjornsen et al. |
|---|---|---|
| 7,647,329 B1 | 1/2010 | Fischman et al. |

(Continued)

FOREIGN PATENT DOCUMENTS

| CN | 101753349 A | 6/2010 |
|---|---|---|
| CN | 104376087 A | 2/2015 |

(Continued)

OTHER PUBLICATIONS

Brandon Williams, Virtual nodes in Cassandra 1.2. Retrieved from https://www.datastax.com/dev/blog/virtual-nodes-in-cassandra-1-2, Dec. 4, 2012, 8 pages.

*Primary Examiner* — Larry T Mackall
(74) *Attorney, Agent, or Firm* — Womble Bond Dickinson (US) LLP

(57) ABSTRACT

This application relates to distributed storage, and in particular, to a distributed shard storage technology. In a method for storing data shards in a distributed storage system, M data nodes on which to-be-stored data will be stored are determined, N replicas of the to-be-stored data are obtained, and each of the N replicas is sharded into X data shards in a same sharding mode. Then the to-be-stored data is stored on the M storage nodes, that is, N replicas of each of the X data shards are respectively stored on N storage nodes, and a quantity of data shards whose data shard replicas are stored on same N storage nodes is P or P+1, where P is an integer quotient of X divided by $C_M^N$.

7 Claims, 8 Drawing Sheets

(56) References Cited

U.S. PATENT DOCUMENTS

| | | | | |
|---|---|---|---|---|
| 2007/0276997 | A1* | 11/2007 | Luning | G06F 11/201 |
| | | | | 711/114 |
| 2015/0169253 | A1* | 6/2015 | Donlan | G06F 3/0647 |
| | | | | 711/161 |
| 2015/0278324 | A1 | 10/2015 | Wong et al. | |
| 2016/0171073 | A1 | 6/2016 | Hattori et al. | |
| 2016/0306822 | A1* | 10/2016 | Waghulde | G06F 16/184 |

FOREIGN PATENT DOCUMENTS

| | | |
|---|---|---|
| CN | 104580427 A | 4/2015 |
| CN | 105335297 A | 2/2016 |
| CN | 105740295 A | 7/2016 |
| CN | 106302702 A | 1/2017 |
| WO | 2014177085 A1 | 11/2014 |

\* cited by examiner

METHOD FOR STORING DATA SHARDS, APPARATUS, AND SYSTEM

CROSS-REFERENCE TO RELATED APPLICATIONS

This application is a continuation of International Application No. PCT/CN2017/079971, filed on Apr. 10, 2017, which claims priority to Chinese Patent Application No. 201610659118.4, filed on Aug. 10, 2016. The disclosures of the aforementioned applications are hereby incorporated by reference in their entireties.

TECHNICAL FIELD

Embodiments of the present invention relate to the distributed storage field, and more specifically, to a method, apparatus, and system for storing data shards in a distributed storage system.

BACKGROUND

With fast development of information technologies, an amount of data in an information system database becomes greater. To satisfy mass data storage requirements, a distributed storage system running on multiple servers is applied extensively. In the distributed storage system, multiple database systems run on multiple servers respectively. Before data is stored, the data first needs to be sharded (sharding), and then different data shards are submitted to different servers for storage. Sharding is a horizontal scaling (horizontal scaling) mode in which a large data set is distributed to multiple data nodes, and all the data nodes form a logical database for storing this large data set. Shards are transparent to a user (an application layer). The user does not know which shard server stores data. Storing data by using data shards can break an I/O capability limit of a single-node server and resolve a database scalability problem.

In addition, to ensure high availability of data and services, a necessary fault tolerance mechanism generally needs to be provided for a distributed database, and redundant backup is performed on each data shard. Storing multiple replicas of the same data shard on different servers can avoid a data shard loss caused when a single server is unavailable.

In some systems, a mutual backup mode is generally used to back up data shards in the distributed storage system. A shard quantity of data shards is generally the same as a quantity of storage nodes. Therefore, a primary shard of each data shard is stored on each storage node, and backup shards are stored on any two other storage nodes different from the storage node on which the primary shard is stored. For example, Table 1 illustrates a common storage policy for storing primary data and two pieces of backup data on six data nodes. The data is sharded into six data shards A-F, and each data shard includes one piece of primary data and two pieces of backup data.

TABLE 1

| Storage node | Data shard |
|---|---|
| Node 1 | A C D |
| Node 2 | B A C |
| Node 3 | C A F |
| Node 4 | D B E |

TABLE 1-continued

| Storage node | Data shard |
|---|---|
| Node 5 | E D F |
| Node 6 | F B E |

Storing the primary shard and the backup shards respectively on different storage nodes can ensure that when a storage node is faulty, the data shard is not lost. The data shard is lost only when all data nodes on which the same data shard is located are faulty. However, when all the data nodes on which the same data shard is located are faulty, a case in which primary data and backup data of two data shards are stored on multiple same nodes may occur. For example, in the example in Table 1, the data shard A and the data shard C are both stored on the nodes 1, 2, and 3, and therefore, when the three data nodes are faulty, the data shards A and C are both lost. In addition, when a single node is faulty, a new node needs to be formed by means of data restoration. However, during data restoration, efficiency of concurrent restoration is not high. For example, in the example in Table 1, when the node 6 is faulty, data restoration can be concurrently implemented separately by using a maximum of only one node that stores the data shard F, B, or E, for example, the node 3, 4, or 5, but other nodes cannot participate in the restoration.

SUMMARY

In view of this, embodiments of the present invention provide a method, apparatus, and system for storing data shards in a distributed storage system to improve data backup availability and data restoration efficiency.

According to a first aspect, an embodiment of the present invention provides a method for storing data shards. The method includes: determining M data nodes on which to-be-stored data will be stored; obtaining N replicas of the to-be-stored data, where in the method for storing data shards of replicas, N is a total quantity of original data and backup data of the to-be-stored data, and sharding each of the N replicas into X data shards in a same sharding mode, so that each data shard has N data shard replicas; and storing the N replicas of the to-be-stored data on the M storage nodes, where the N data shard replicas of each of the X data shards are respectively stored on N storage nodes. A quantity of data shards whose replicas are stored on same N storage nodes is minimized. Specifically, the quantity of the data shards whose data shard replicas are stored on the same N storage nodes is P or P+1, where P is an integer quotient of X divided by $C_M^N$ (the integer quotient is an incomplete quotient or a partial quotient; for example, when X is 10 and $C_M^N$ is 3, the integer quotient P is 3). Because the quantity of the data shard replicas on the same N storage nodes is minimized, when any N storage nodes are simultaneously faulty, a maximum data loss that may be caused is minimized. Therefore, in comparison with other systems, a data loss ratio is reduced, and data backup availability is improved. In addition, because the replicas of each data shard are distributed on different nodes evenly, when a node is faulty, data shards stored on the node may be recovered by using corresponding replicas stored on multiple different nodes. Therefore concurrent restoration efficiency is improved.

In a possible design, when a replica is sharded, a value of the quantity X of the shards is set based on an optimal shard base Y, where $Y=C_M^N$. The quantity X of the shards may be equal to or less than a product of the optimal shard base Y and a coefficient K, and K is an integer greater than or equal to 1.

In an embodiment of an implementation of the design, a value of X is less than the product of Y and K. In this case, when the value of X is closer to the product of Y and K, and the N storage nodes are simultaneously faulty, a ratio of a maximum amount of data that may be lost to a total amount of stored data is smaller.

In an embodiment of an implementation of the design, a value of X is the product of Y and K. In this case, when the N storage nodes are simultaneously faulty, a ratio of a maximum amount of data that may be lost to a total amount of stored data is smallest.

In an embodiment of an implementation of the design, the coefficient K may be determined according to a load balancing requirement of a distributed storage system when the quantity X of the shards of the to-be-stored data is determined. If a value of K is greater, a load balancing degree of the to-be-stored data is higher.

In a possible design, the quantity X of the shards of the to-be-stored data is determined according to a current load balancing status of a distributed storage system. When a load balancing degree of the to-be-stored data in the distributed storage system needs to be increased, the quantity X of the shards may be greater. In this way, a smaller data granularity is obtained, and the load balancing degree is increased.

In a possible design, the quantity N of the replicas of the to-be-stored data is determined according to a security requirement of the to-be-stored data, and if the quantity N of the replicas is greater, a higher security requirement of the to-be-stored data can be satisfied. That is, if a data shard needs to be lost, a quantity of nodes that are simultaneously faulty needs to be greater.

In a possible design, the quantity N of the replicas of the to-be-stored data is determined according to a data type of the to-be-stored data and a correspondence between the data type and the quantity of the replicas. Therefore, data availability is ensured for different types of data more flexibly.

In a possible design, when the to-be-stored data is stored on the storage nodes, $C_M^N$ data node combinations for selecting N data nodes from the M data nodes are determined; the quotient P obtained by dividing the quantity X of the shards by $C_M^N$, and a remainder Q are determined; and Q data node combinations for storing P+1 data shards are selected from the $C_M^N$ data node combinations, and remaining $C_M^N$–Q data node combinations are used for storing P data shards, where the N replicas of each data shard are respectively stored on N different data nodes in a to-be-stored data node combination.

According to a second aspect, an embodiment of the present invention provides a method for determining data shards in a distributed storage system. The method includes: determining M data nodes on which to-be-stored data will be stored, and obtaining a quantity N of replicas of the to-be-stored data, so as to determine a quantity X of shards of the to-be-stored data. X is equal to or less than a product of the optimal shard base Y and a coefficient K, and K is an integer greater than or equal to 1. When a value of X is closer to the product of Y and K, and N storage nodes are simultaneously faulty, a ratio of a maximum amount of data that may be lost to a total amount of stored data is smaller. When a value of X is the product of Y and K, a ratio of a maximum amount of data that may be lost to a total amount of stored data is smallest.

In a possible design, the coefficient K is determined according to a load balancing requirement of the distributed storage system. The coefficient K is an integer greater than or equal to 1, and if a value of K is greater, a load balancing degree of the to-be-stored data is higher. The quantity X of the shards is equal to or less than $KC_M^N$.

In a possible design, after the quantity X of the shards is determined, a policy for storing the to-be-stored data on the M storage nodes is determined, where N data shard replicas of each of the X data shards are respectively stored on N storage nodes in the M storage nodes, and a quantity of data shards whose data shard replicas are stored on same N storage nodes is P or P+1, where P is an integer quotient of X divided by $C_M^N$.

In an embodiment of a possible implementation of the design, a specific manner of determining the storage policy is: determining $C_M^N$ data node combinations for selecting N data nodes from the M data nodes when storing the N replicas of the to-be-stored data on the M data nodes; determining the quotient P obtained by dividing the quantity X of the shards by $C_M^N$, and a remainder Q; and selecting, from the $C_M^N$ data node combinations, Q data node combinations for storing P+1 data shards, and using remaining $C_M^N$–Q data node combinations for storing P data shards, where the N replicas of each data shard are respectively stored on N different data nodes in a to-be-stored data node combination.

In a possible design, the quantity N of the replicas of the to-be-stored data may be determined according to a security requirement of the to-be-stored data, and if a value of the quantity N of the replicas is greater, a higher security requirement of the to-be-stored data can be satisfied.

In a possible design, the quantity N of the replicas of the to-be-stored data is determined according to a data type of the to-be-stored data and a correspondence between the data type and the quantity of the replicas. Therefore, data availability may be ensured to different degrees for different types of data.

According to a third aspect, an embodiment of the present invention provides a distributed storage device, where the device may implement functions in the first or second method design. The functions may be implemented by hardware, or may be implemented by corresponding software executed by hardware. The hardware or software includes one or more modules corresponding to the functions. The module may be software and/or hardware.

In a possible design, a structure of the device includes a processor, and a memory connected to the processor. The processor invokes an instruction stored in the memory, so that the processor is configured to perform the method in the first or second aspect.

In a possible design, the device includes an obtaining unit and a storage unit. The obtaining unit is configured to determine M storage nodes on which to-be-stored data will be stored, and obtain N replicas of the to-be-stored data, where the N replicas include original data of the to-be-stored data and N−1 pieces of backup data of the original data, and each of the N replicas is sharded into X data shards in a same sharding mode, so that each data shard has N data shard replicas, where N is less than or equal to M. A determining unit stores the N replicas of the to-be-stored data on the M storage nodes, where the N data shard replicas of each of the X data shards are respectively stored on N storage nodes in the M storage nodes, and a quantity of data shards whose data shard replicas are stored on same N storage nodes is P or P+1, where P is an integer quotient of X divided by $C_M^N$.

In a possible design, the device includes an obtaining unit and a determining unit. The obtaining unit is configured to obtain M data nodes on which to-be-stored data will be stored, and a quantity N of replicas of the to-be-stored data. The determining unit determines a quantity X of shards according to the method in the second aspect.

According to a fourth aspect, an embodiment of the present invention provides a distributed storage system. The distributed storage system includes a client, multiple hard disks, and a distributed storage device. The distributed storage device may be the device in the design of the third aspect, and is configured to perform the corresponding method in the first aspect or second aspect.

According to a fifth aspect, an embodiment of the present invention provides another distributed storage system. The system includes a client and a distributed storage server system. The distributed storage server system may include a control server, an operation, administration and maintenance (OAM) server, a service server, a storage resource pool, and a storage engine. Herein the storage engine may be configured to perform the corresponding method in the first aspect or second aspect.

In comparison with other systems, embodiments of the present invention discussed in greater detail herein provide methods, techniques, and systems for storing data shards in a distributed environment to improve data availability and data restoration efficiency when a node is faulty.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description merely show some embodiments of the present invention, and a person of ordinary skill in the art can derive other implementations from these accompanying drawings without creative efforts. All the embodiments or implementations shall fall within the protection scope of the present invention.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

To help understand the embodiments of the present invention, a system architecture of a distributed storage system to which embodiments of the present invention is applied is described first. In the distributed storage system, data is stored on multiple independent devices in a distributed manner. In a conventional network storage system, a centralized storage server is used to store all data. The storage server becomes a bottleneck of system performance and also a focus of reliability and security, and cannot satisfy a requirement of a large-scale storage application. The distributed network storage system as discussed herein uses an extensible system architecture, uses multiple storage servers to share storage load, and uses a location server to locate storage information. The distributed network storage system as discussed herein not only improves reliability, availability, and access efficiency of the system, but also is easily extensible.

Figure 1:
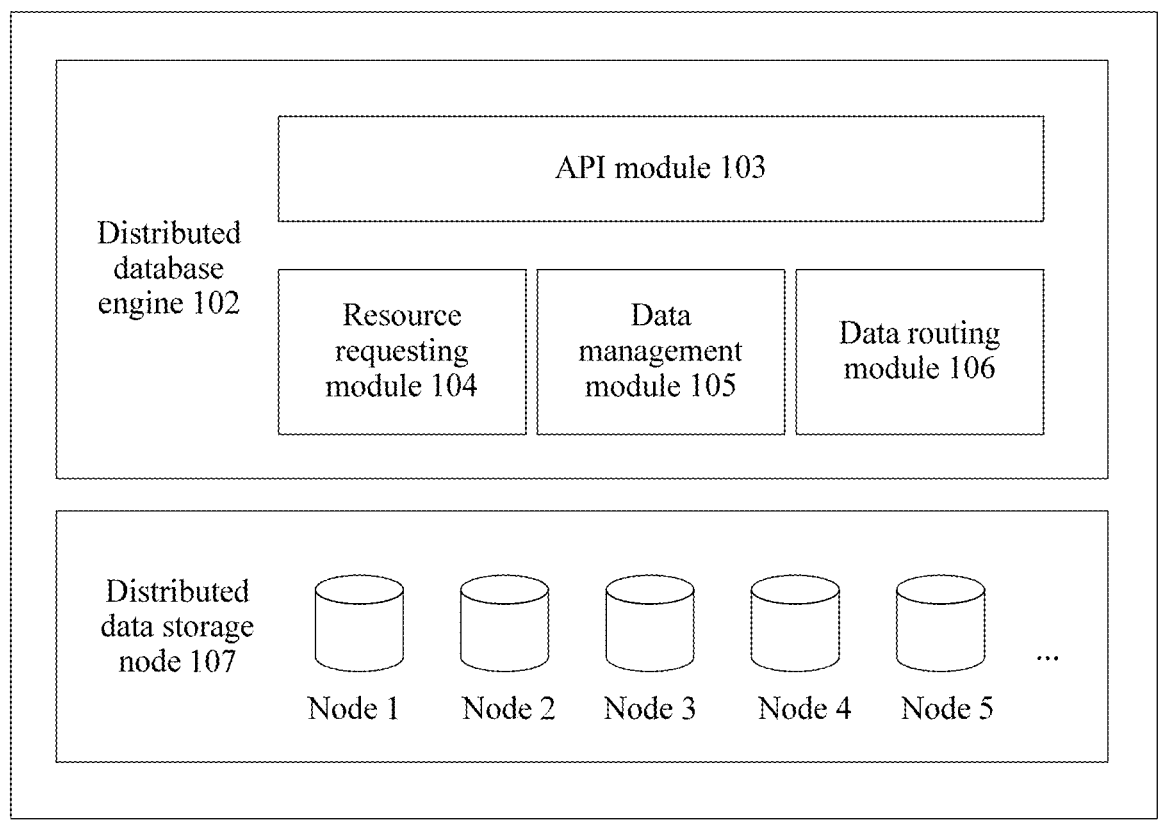
FIG. 1 is a possible schematic architecture diagram of a system according to the present invention.

As shown in FIG. 1, FIG. 1 is a schematic architecture diagram of a distributed storage system. It should be noted that, the distributed storage system is described only by using an example, and an application scope of the present invention is not limited to this. The distributed storage system shown in the figure includes a distributed database engine 102 and a distributed data storage node 107. The distributed database engine 102 is a system core. The distributed database engine 102 is responsible for operations such as data parsing, routing, distribution, and merging, and manages numerous storage nodes at a bottom layer. The distributed storage node is a combination of multiple data nodes for storing data. A user may construct data node clusters on different scales flexibly according to requirements.

The distributed database engine 102 includes an application programming interface (API) module 103, providing an interface for a client to invoke a database. A resource requesting module 104 determines, according to a storage requirement of the client and a storage capacity of each node provided by the distributed data storage node, a quantity of nodes to be provided for the client according to the current storage requirement. Optionally, a quantity of backup replicas of to-be-stored data may be further determined according to a data reliability requirement submitted by the user. A data management module 105 determines a storage policy according to requested storage resources, that is, a quantity of data shards, and a correspondence between the data shards and the storage nodes. A data routing module 106 routes a request from the client according to the storage policy determined by the data management module, shards the data and routes the data shards to the data nodes, or aggregates data of each node and returns the data to the client.

It should be understood that, in the distributed storage system, a function of a module is implemented by a server. Generally, a functional module may be implemented by an independent server. However, in some cases, multiple functional modules may also be implemented by one server, or a functional module is implemented by a cluster formed by multiple servers.

Figure 2:
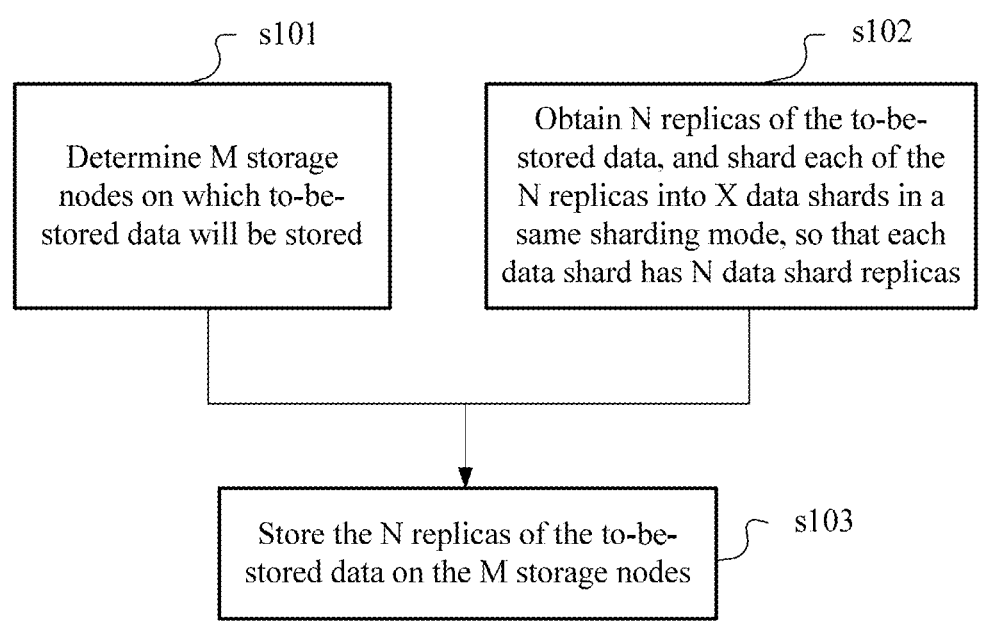
FIG. 2 is a schematic flowchart of determining a shard storage policy in a distributed storage system according to an embodiment of the present invention.

Referring to FIG. 2, FIG. 2 is a schematic flowchart of Embodiment 1 of the present invention. In this embodiment of the present invention, a method for determining a policy for storing data shards in a distributed storage system is provided. With reference to the foregoing descriptions, a policy for storing data shards is determined mainly by improving the data management module 105.

In this embodiment of the present invention, a client initiates a data storage request to the distributed storage system, and stores to-be-stored data in the distributed storage system. It should be understood that, in this embodiment, a sequence of steps performed in the method is not limited. Referring to FIG. 2, a person skilled in the art may understand that, both S101 and S102 are steps prior to step S103, that is, S101 and S102 may be performed according to any sequence, or one or more steps may be performed concurrently and simultaneously.

As shown in FIG. 2, the method includes the following steps.

S101. Determine M data nodes on which to-be-stored data will be stored.

The M data nodes on which the to-be-stored data will be stored may be determined according to a data size of the to-be-stored data and a storage capacity that each data node can provide. In some cases, a quantity of data nodes on which data will be stored may also be a preset fixed value, or a total quantity of storage nodes. In addition, the quantity M of the data nodes may also be determined according to a value set by a user by using an API interface.

In an embodiment of a design, when the data nodes on which the data will be stored is determined, M data nodes with relatively low load may be selected according to a load status of each node, as the data nodes on which the data will be stored, so as to increase a load balancing degree of an entire distributed storage system.

S102. Obtain N replicas of the to-be-stored data.

For ease of description, in an embodiment of the present invention, the quantity N of the replicas is a total quantity of original data and backup data of the to-be-stored data, that is, the N replicas include the original data of the to-be-stored data and N−1 pieces of backup data of the original data. To ensure data availability, redundant backup needs to be performed on the to-be-stored data. If the quantity N of the replicas of the to-be-stored data is greater, a redundancy degree of the to-be-stored data is higher. Therefore, reliability of the to-be-stored data is higher, but more storage space is also occupied. Generally, the quantity of data replicas is a preset value, and may be preset by the user or set according to different to-be-stored data every time a storage request is initiated.

It may be understood that, to ensure isolation of redundant backup of the replicas, replicas of a same piece of data should be stored on different storage nodes. In this way, it is ensured that other replicas are not lost when a storage node is faulty. Therefore, for a same distributed system, a value of the quantity N of the replicas should be less than or equal to a value of the quantity M of the data nodes.

Optionally, the quantity N of the replicas of the to-be-stored data may be determined according to a security requirement of the to-be-stored data. When the security requirement of the to-be-stored data is higher, the value of the quantity N of the replicas of the to-be-stored data is greater. The security requirement of the data may be obtained directly according to a storage request of the user, that is, in different storage requests, the user has different security requirements for the to-be-stored data; or the security requirement of the to-be-stored data may be determined according to preset determining logic, for example, a correspondence between different data types and security requirements, or a correspondence between different user types and security requirements. On some server platforms, for example, on a PaaS (Platform-as-a-Service, platform-as-a-service) platform, security requirements of data of different applications deployed by the user on the platform are different, and the security requirement of the to-be-stored data may be further determined according to different applications or application types.

Optionally, the quantity N of the replicas of the to-be-stored data may be determined according to a data type of the to-be-stored data and a correspondence between the data type and the quantity of the replicas. Therefore, availability of different types of data is protected to different degrees.

Each of the N replicas is sharded into X data shards in a same sharding mode, so that each data shard has N data shard replicas. The quantity X of the shards is a quantity of shards after a replica of the to-be-stored data is sharded. When shards are stored, primary data and backup data of the to-be-stored data both need to be sharded in the same sharding mode. In this way, primary data shards and backup data shards corresponding to the primary data shards are obtained. After the sharding, each data replica is sharded into X same data shards. Therefore, for a data shard, there are N same shard replicas including the data shard. It may be understood that, after the quantity X of the shards of the to-be-stored data is determined, a total of N×X data shards of the to-be-stored data need to be stored on the M nodes.

In some cases, the quantity X of the shards may be preset by the user, that is, a same quantity of shards may be used for any to-be-stored data. Alternatively, according to different to-be-stored data, a quantity of shards of the to-be-stored data may be set when the user initiates a storage request.

Optionally, the quantity of the data shards stored on the storage nodes is greater if the quantity of the shards is greater. Therefore, a data shard granularity is reduced, the data is stored on the nodes evenly more easily, and load balancing is implemented as much as possible. Therefore, according to a current load balancing status of the distributed storage system, different shard quantities are set for the to-be-stored data. For example, when the distributed system has a higher requirement on load balancing, the shard quantity is dynamically increased, so that the load balancing degree of the distributed system is increased.

S103. Store the N replicas of the to-be-stored data on the M storage nodes.

Specifically, an embodiment of the method followed during storage is: the N data shard replicas of each of the X data shards are respectively stored on N storage nodes in the M storage nodes, and a quantity of data shards whose data shard replicas are stored on same N storage nodes is P or P+1, where P is an integer quotient of X divided by $C_M^N$.

The quantity of the data shards on the same N storage nodes is: for any N data nodes in the distributed system, a quantity of data shards with all N replicas thereof stored on the N data nodes. The quantity of the data shards whose data shard replicas are stored on the same N storage nodes is P or P+1, where P is the integer quotient of X divided by $C_M^N$. In essence, the quantity of the data shards stored on the same N storage nodes is minimized. That is, the data nodes need to be stored in a possible combination of N data nodes evenly, so that a quantity of data shards stored in each combination of N data nodes is relatively even. Therefore, any N data nodes are selected, and a maximum value of a quantity of possible data nodes storing all the N replicas is minimized. It may be understood that, each data shard is stored on N nodes, that is, a combination of N nodes. However, for selecting a combination of N nodes in a distributed system including M storage nodes, a total of $C_M^N$ different combinations may exist. Therefore, when the quantity X of the shards is less than $C_M^N$, different N data shards may be selected for each data shard, that is, a quantity of data shards stored on same N nodes is 1. When the quantity X of the shards is greater than $C_M^N$, a case in which multiple data shards are stored on same N nodes occurs. Specifically, given the integer quotient P obtained by dividing the quantity X of the shards by $C_M^N$, and a remainder Q, Q data node combinations for storing P+1 data shards are selected from the $C_M^N$ data node combinations, and remaining $C_M^N$-Q data node combinations are used for storing P data shards.

For example, when 40 data shards need to be stored, each data shard has three replicas. However, in the distributed system, there are 20 different combinations of three data nodes in total. Therefore, during storage, a quantity of data shards stored on same three storage nodes needs to be minimized, that is, each combination stores all replicas of two different data nodes. When 50 data shards need to be stored, 10 data node combinations are required to store all replicas of three different data nodes, but other 10 data node combinations store all replicas of two different data nodes.

The following provides an embodiment of a specific storage algorithm by using an example, so as to obtain a storage policy satisfying the foregoing storage mode. It should be understood that, the described embodiment of the algorithm is only a design of a storage policy for storing the to-be-stored data on the storage nodes according to the foregoing principle. On a basis of understanding the foregoing allocation principle, a person skilled in the art may implement the foregoing storage policy by using multiple different specific algorithms. The algorithms are not illustrated herein one by one.

One embodiment of the algorithm includes the following steps:

1. numbering X to-be-stored data shards 1, 2, 3, ..., X;
2. numbering all data nodes 1, 2, 3, ..., N;
3. creating a storage allocation table, where the storage allocation table includes $C_M^N$ rows and N columns, a row includes N data nodes, and data node combinations included in the rows are mutually different, that is, data nodes in each row are one of $C_M^N$ data node combinations;
4. determining a correspondence between data shards and a data node combination in each row in the storage allocation table, where given a quotient P obtained by dividing the quantity X of the shards by $C_M^N$, an $N^{th}$ row in the storage allocation table corresponds to a $K^{th}$ data node respectively, $K=C_M^N \times (i-1)+N$ ($1 \leq i \leq P$), and $K \leq X$; and
5. storing, according to the determined correspondence, N replicas of each data node on N data nodes corresponding to the data node in a row in the storage allocation table, where the storage policy is a storage policy complying with the foregoing principle.

Figure 3:
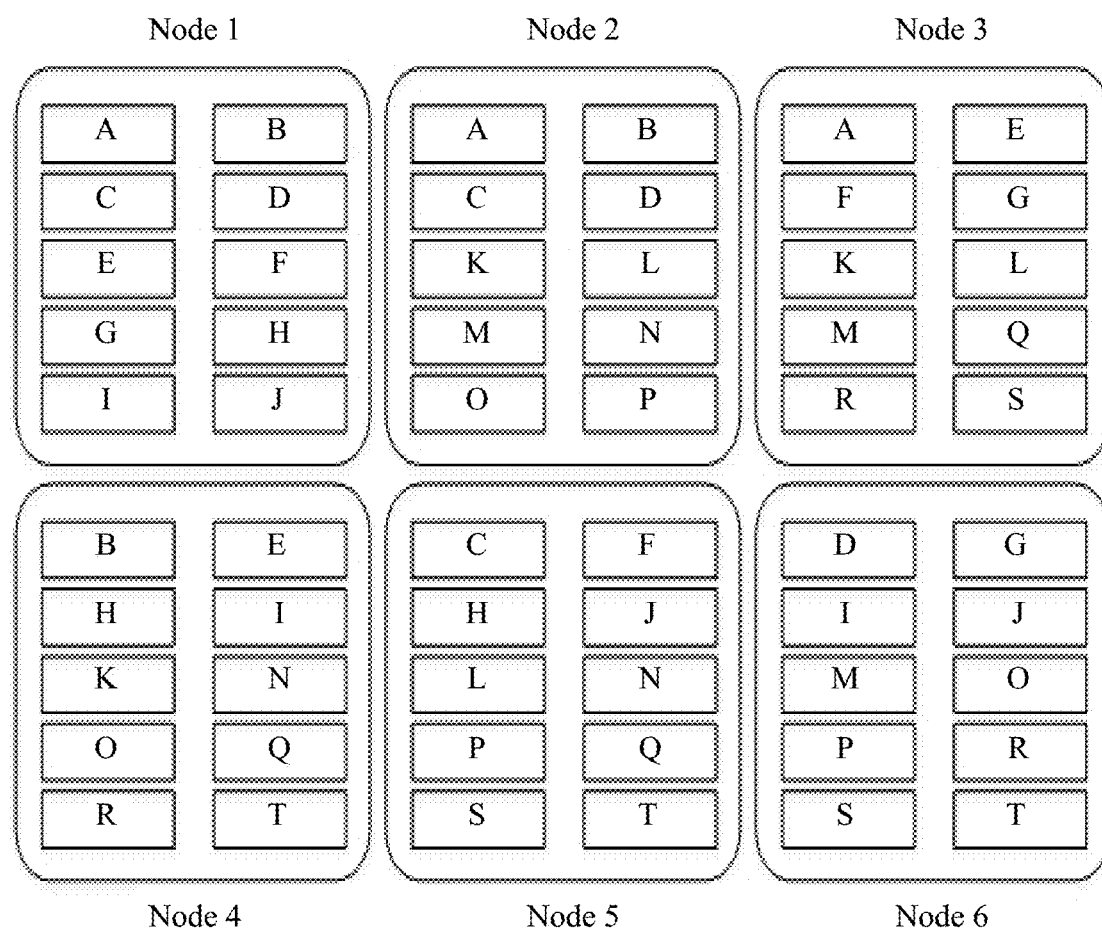
FIG. 3 is a schematic diagram of a possible shard storage policy in a distributed storage system according to an embodiment of the present invention.

To help understand this embodiment, the following provides a specific example of a storage policy obtained according to this method embodiment. FIG. 3 shows one of the storage policies obtained according to this embodiment of the present invention, for storing to-be-stored data in a distributed system in which a quantity M of data nodes is 6, where a quantity N of replicas of the to-be-stored data is 3 and a quantity X of shards thereof is 20. In this policy, because $C_6^3=20$, and is exactly equal to the quantity of the shards, a quantity of data shards stored on same three storage nodes needs to be minimized, that is, each combination of three storage nodes stores three replicas of a data shard. Therefore, in this example, any three storage nodes are selected, and the three storage nodes all completely store all three replicas of one data shard only. For example, nodes 1, 2, and 3 only completely store all three replicas of a data shard A, but nodes 1, 2, and 4 only completely store all three replicas of a data shard B. Because each data shard is stored on three different data nodes, to cause a complete loss of a data shard, at least three data nodes need to be simultaneously faulty. However, in the storage policy in this example, when any three data nodes are simultaneously faulty, only one data shard is lost. For example, when the nodes 1, 2, and 3 are faulty, only the data shard A is lost, but other data shards have at least one data shard replica stored on other nodes.

Figure 4:
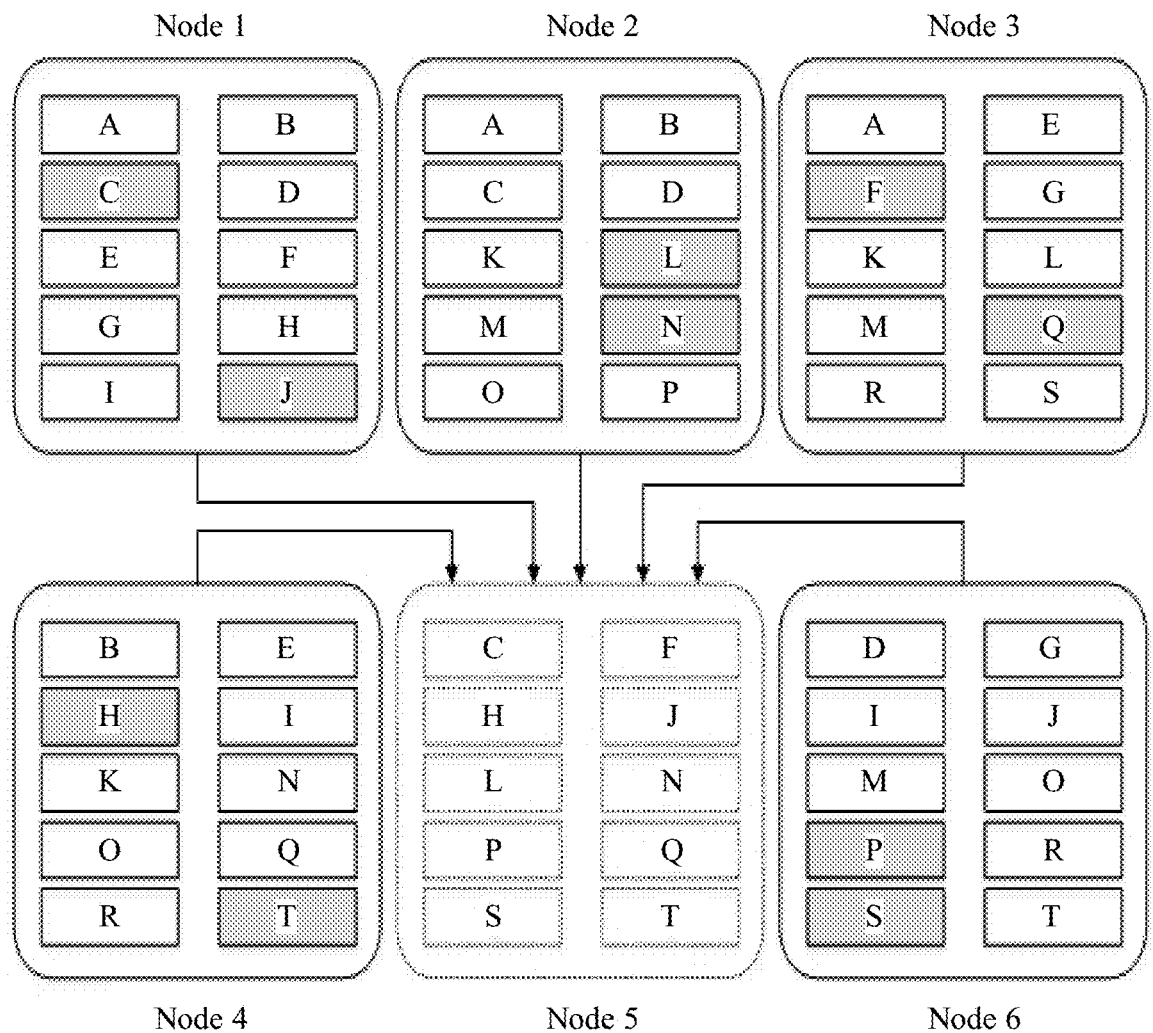
FIG. 4 is a schematic diagram of node restoration in a possible shard storage policy in a distributed storage system according to an embodiment of the present invention.

In addition, in this example, when any data node is faulty, because replicas of data shards are distributed evenly on other data nodes, the other nodes may all perform data restoration on this node simultaneously. For example, as shown in FIG. 4, FIG. 4 illustrates a possible data restoration mode when a node 5 is faulty. Data shard replicas stored on the node may be recovered respectively by using grey replicas on other five data nodes.

This embodiment of the present invention is applicable to storing data with different quantities of shards and different quantities of replicas in a distributed system, and a quantity of shards and a quantity of replicas may be adjusted flexibly according to different to-be-stored data. Because it is ensured that a quantity of data shards stored on same N nodes is minimized, when N nodes are simultaneously faulty, a quantity of data shards that may be lost is minimized. Therefore, data backup availability is improved. In addition, because a storage policy in which a quantity of shards is greater than a quantity of nodes may be implemented in this solution, a quantity of data shards stored on a single node is increased. When a single node is faulty, because replicas of the data shards stored on the node are evenly distributed other data nodes, a quantity of data nodes that can participate in data restoration is increased, that is, a quantity of concurrent data recoveries is increased when the node is faulty, and data restoration efficiency is improved.

The following describes a second embodiment of the present invention. In this embodiment, a method for determining a quantity of shards of to-be-stored data is provided. Higher data availability may be achieved by using the quantity of the shards of the to-be-stored data. In this embodiment, a method for determining a quantity of data nodes on which the to-be-stored data will be stored and obtaining a quantity of replicas of the to-be-stored data is similar to the method described in S101 and S102 in the foregoing embodiment. Details are not described again herein. In addition, the shard quantity determined according to this method embodiment may be used for sharding data replicas according to step S102 in the foregoing embodiment. Similarities are not described again herein in this embodiment.

In this embodiment, determining a quantity X of shards of to-be-stored data includes:

S201. Determine an optimal shard base Y of the to-be-stored data according to a quantity N of replicas and a quantity M of storage nodes, where $Y=C_M^N$.

S202. Obtain the quantity X of the shards of the to-be-stored data according to the optimal shard base Y, where the quantity X of the shards of the to-be-stored data is equal to or less than a product of the optimal shard base Y and a coefficient K, and K is an integer greater than or equal to 1.

As can be known from the foregoing description, when the quantity of the replicas is N and the quantity of the storage nodes is M, and the to-be-stored data is stored on the M nodes, each data shard of the to-be-stored data needs to be stored on the N nodes. There are $C_M^N$ combinations in total for selecting N data nodes from the M data nodes. To improve data availability, so that a quantity of data shards that may be lost when any N nodes are faulty is minimized, each data shard should be stored in different combinations of data nodes preferably. Therefore, it can be known that, when the quantity of the shards is less than $C_M^N$, if the quantity of the shards is greater, a maximum amount of data that may be lost when the N nodes are faulty is smaller. Specifically, if the quantity of the shards is X, and a size of each data shard is equal, when $X \le C_M^N$, a maximum amount of data that may be lost when the N nodes are faulty is 1/X of a total data amount. Therefore, when $X = C_M^N$, a total amount of data that may be lost is minimized, and is $1/C_M^N$.

When the quantity X of the shards is greater than $C_M^N$, two or more data shards are stored on same N nodes, and when the N data nodes are faulty, the two or more data shards may be lost. Assuming that an integer quotient of X divided by $C_M^N$ is P, when N nodes are faulty, and a size of each data shard is equal, a maximum amount of data that may be lost is P/X of a total data amount. Therefore, it can be known that, when X is an integer multiple of $C_M^N$, a value of P/N is equal to $1/C_M^N$. In this case, a total amount of data that may be lost is also minimized.

Figure 5:
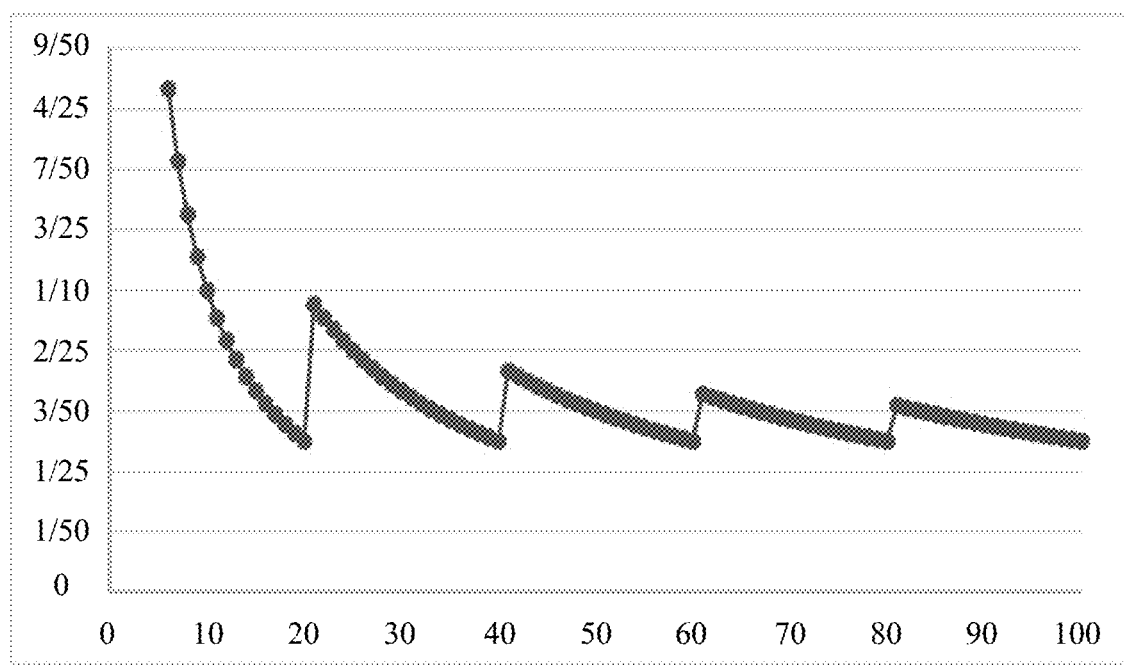
FIG. 5 is an exemplary diagram of a correspondence between a quantity of shards and a data loss ratio when multiple nodes are faulty in a possible scenario according to an embodiment of the present invention.

For ease of understanding, given different shard quantities, a change of a ratio of a maximum amount of data that may be lost to a total amount when any three data nodes are faulty is hereinafter described by using an example in which a quantity of data nodes is 6, a quantity of replicas is 3, and sizes of data shards are equal. As shown in FIG. 5, a horizontal coordinate is a quantity X of data shards, a vertical coordinate is a ratio of a maximum amount of data that may be lost to a total amount when any three data nodes are faulty, and a function graph thereof is shown in the figure.

If the quantity of the data shards is 6, the maximum amount of data lost when three nodes are faulty is 1/6 of all data;

if the quantity of the data shards is 7, the maximum amount of data lost when three nodes are faulty is 1/7 of all data;

if the quantity of the data shards is 20, the maximum amount of data lost when three nodes are faulty is 1/20 of all data;

if the quantity of the data shards is 21, the maximum amount of data lost when three nodes are faulty is 2/21 of all data;

if the quantity of the data shards is 40, the maximum amount of data lost when three nodes are faulty is 2/40 of all data; and if the quantity of the data shards is 41, the maximum amount of data lost when three nodes are faulty is 3/41 of all data. . . .

Therefore, it can be known that, using $C_M^N$ as a base, the quantity X of the shards of the to-be-stored data is equal to the product of the optimal shard base Y and the coefficient K. When N nodes are faulty, a ratio of a maximum amount of data that may be lost to the total data amount is minimized, that is, data availability is highest. In addition, when the quantity X of the data shards is less than $C_M^N$ or an integer multiple of $C_M^N$, if the quantity X of the shards is closer to $C_M^N$ or the integer multiple of $C_M^N$, the ratio of the maximum amount of data that may be lost to the total data amount is smaller, and data availability is higher. Therefore, when the quantity X of the shards of the to-be-stored data is less than and closer to the product of the optimal shard base Y and the coefficient K, higher data availability may also be obtained.

As can be seen, when the quantity X of the data shards is $C_M^N$ or an integer multiple (greater than 1) of $C_M^N$, an optimal value may be obtained in consideration of data availability. However, when the optimal value cannot be obtained, when the value is less than and closer to $C_M^N$ or an integer multiple (greater than 1) of $C_M^N$, data availability is higher. Therefore, when the quantity X of the shards is determined, to achieve optimal data availability, $C_M^N$ or an integer multiple (greater than 1) of $C_M^N$ should be selected as the quantity X of the shards. However, comprehensively considering other factors, when $C_M^N$ or an integer multiple (greater than 1) of $C_M^N$ is not used as the quantity X of the shards, if the quantity X of the shards is less than and closer to $C_M^N$ or the integer multiple (greater than 1) of $C_M^N$, data availability can be improved more easily.

Specifically, when considering that the quantity X of the shards is less than $C_M^N$ or an integer (greater than 1) of $C_M^N$, a final value of X may be determined with reference to an effect that the present invention needs to achieve in a specific scenario. A technical effect expected to be achieved is that when N nodes are faulty, a maximum data loss ratio that may be caused is less than Q. With reference to the foregoing description, it may be understood that, when K is an integer greater than or equal to 1, within an interval [(K−1) $C_M^N$, $KC_M^N$], when N nodes are faulty, a maximum data loss ratio that may be caused is monotonically decreased, and a maximum data loss ratio that may be caused and corresponds to a value of X within the interval is K/X. Therefore, K/X should be less than Q, that is, the value of X should be greater than K/Q. Correspondingly, when the value of K/Q is less than or equal to (K−1) $C_M^N$, setting X to any value within the interval [(K−1) $C_M^N$, $KC_M^N$] may satisfy that a maximum data loss ratio that may be caused is less than Q; when the value of K/Q is greater than (K−1) $C_M^N$, setting X to any value within an interval [[K/Q, $KC_M^N$] may satisfy that a maximum data loss ratio that may be caused is less than Q.

Optionally, if the quantity of the shards is greater, a load balancing degree that may be implemented when the to-be-stored data is stored on the data nodes is higher; therefore, in this implementation, the coefficient K may be determined according to a load balancing requirement of a distributed storage system. The coefficient K is an integer greater than or equal to 1, and is used to determine a multiple of the optimal shard base. When the load balancing requirement of the to-be-stored data is higher, a value of the coefficient K is greater. The value of the quantity X of the shards is equal to or less than the product of the optimal shard base Y and the coefficient K. That is, when the quantity X of the shards is equal to the product of the optimal shard base Y and the coefficient K, optimal data availability may be obtained, and the load balancing requirement of the distributed storage system is satisfied. However, comprehensively considering other factors, when the value of the quantity X of the shards is not the product of the optimal shard base Y and the coefficient K, if the value of the quantity X of the shards is closer to the product of the optimal shard base Y and the coefficient K, data availability is higher, and the load balancing requirement of the distributed storage system can be satisfied more easily.

In this embodiment, an optimal shard base Y is determined, and further, a quantity of shards is determined according to the optimal shard base. Therefore, on a basis of advantages of the foregoing embodiment, data availability may be further improved. Given a same data node quantity and a same replica quantity, optimal or relatively high data availability may be achieved according to the shard quantity determined according to the optimal shard base. In addition, because the value of the determined shard quantity is always greater than the quantity of nodes, load balancing of the distributed system is improved, and efficiency of concurrent restoration when a node is faulty is improved.

Figure 6:
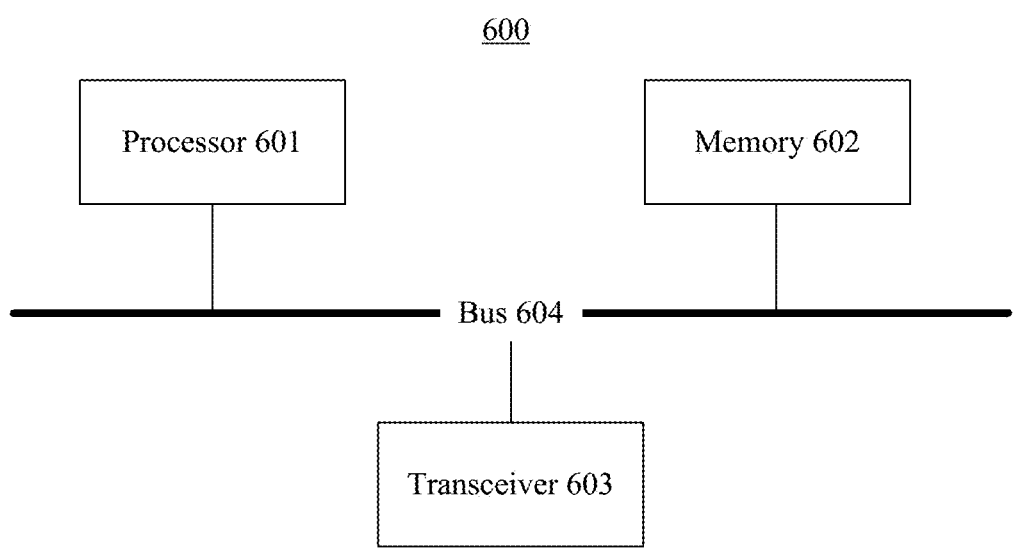
FIG. 6 is a schematic structural diagram of a distributed storage device according to an embodiment of the present invention.

Referring to FIG. 6, FIG. 6 is a distributed storage device 600 according to a next embodiment of this application. The device 600 may be a node deployed in a distributed storage system, or may be an independent data management apparatus in a distributed storage system. The device 600 includes but is not limited to a device such as a computer or a server. As shown in FIG. 6, the device 600 includes a processor 601, a memory 602, a transceiver 603, and a bus 604. The transceiver 603 is configured to transmit data to or receive data from an external device (for example, another node in the distributed system or a network device out of the distributed system). There may be one or more processors 601 in the device 600. In some embodiments of this application, the processor 601, the memory 602, and the transceiver 603 may be connected by using a bus system or in other manners. For meanings of terms and examples used in this embodiment, refer to the foregoing embodiment. Details are not described again herein.

The memory 602 may store program code. The processor 601 is configured to invoke the program code stored in the memory 602, so that the processor is configured to perform operations of S101, S102, and S103 in the foregoing embodiment.

For understanding of the foregoing operations, refer to the descriptions in the first method embodiment. Details are not described again herein.

Optionally, the processor 501 may be further configured to perform fractionalized steps in the foregoing first embodiment or an optional solution.

Optionally, in this embodiment, when determining a quantity X of shards, the processor 501 may further determine the quantity X of the shards by performing operations of S201 and S202: determine an optimal shard base Y of to-be-stored data according to a quantity N of replicas and a quantity M of storage nodes, where the optimal shard base Y is equal to $C_M^N$; and obtain the quantity X of the shards of the to-be-stored data according to the optimal shard base Y, where the quantity X of the shards of the to-be-stored data is equal to or less than the optimal shard base Y or equal to or less than a natural number multiple of the optimal shard base Y.

For understanding of performing the foregoing steps, refer to the descriptions in the foregoing second embodiment. The foregoing steps may also be extended or fractionalized with reference to the foregoing second embodiment.

It should be noted that, herein the processor 601 may be a processing unit, or may be a general designation of multiple processing units. For example, the processing unit may be a central processing unit (CPU), or may be an application-specific integrated circuit (ASIC), or is configured as one or more integrated circuits for implementing the embodiments of this application, for example, one or more microprocessors, one or more digital signal processors (DSP), or one or more field programmable gate arrays (FPGA).

The memory 603 may be a storage apparatus, or may be a general designation of multiple storage units, and is configured to store executable program code, or parameters, data, and the like that are required for running an application program running apparatus. In addition, the memory 603 may include a random access memory (RAM), or may include a non-volatile memory, for example, a disk storage, or a flash memory.

The bus 604 may be an industry standard architecture (ISA) bus, a peripheral component interconnect (PCI) bus, an extended industry standard architecture (EISA) bus, or the like. The bus may be categorized as an address bus, a data bus, a control bus, or the like. For ease of indicating, the bus in FIG. 6 is indicated only by a bold line. However, this does not mean that only one bus or one type of bus exists.

The user equipment may further include an input/output apparatus connected to the bus 604, so that the input/output apparatus is connected to other parts such as the processor 601 by using the bus. A user may implement, by using an input device, a step that requires manual configuration or presetting of parameters in this embodiment. The input/output apparatus may provide an input interface for an operator, so that the operator selects a control option by using the input interface. Alternatively, the input/output apparatus may be another interface, and another external device may be connected by using this interface.

Figure 7:
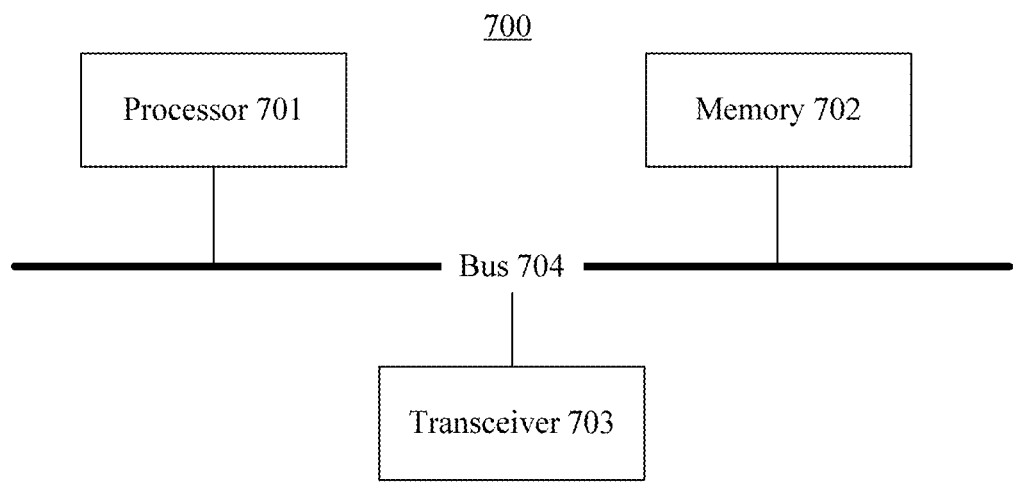
FIG. 7 is a schematic structural diagram of another distributed storage device according to an embodiment of the present invention.

Referring to FIG. 7, FIG. 7 is a distributed storage device 700 according to a next embodiment of this application. The device 700 may be a node deployed in a distributed storage system, or may be an independent data management apparatus in a distributed storage system. The device 700 includes but is not limited to a device such as a computer or a server. As shown in FIG. 7, the device 700 includes a processor 701, a memory 702, a transceiver 703, and a bus 704. The transceiver 703 is configured to transmit data to or receive data from an external device (for example, another node in the distributed system or a network device out of the distributed system). There may be one or more processors 701 in the device 700. In some embodiments of this application, the processor 701, the memory 702, and the transceiver 703 may be connected by using a bus system or in other manners. For meanings of terms and examples used in this embodiment, refer to the foregoing embodiment. Details are not described again herein.

The memory 702 may store program code. The processor 701 is configured to invoke the program code stored in the memory 702, so that the processor is configured to perform the foregoing operations of S201 and S202 to determine a quantity of shards when the shards are stored in the distributed storage system.

For understanding of the foregoing operations, refer to the descriptions in the second method embodiment. Details are not described again herein.

Optionally, the processor 701 may be further configured to perform fractionalized steps in the foregoing second embodiment or an optional solution.

It should be noted that, herein the processor 701 may be a processing unit, or may be a general designation of multiple processing units. For example, the processing unit may be a central processing unit (CPU), or may be an application-specific integrated circuit (ASIC), or is configured as one or more integrated circuits for implementing the embodiments of this application, for example, one or more microprocessors, one or more digital signal processors (DSP), one or more field programmable gate arrays (FPGAs), or other processing systems.

The memory 702 may be a storage apparatus, or may be a general designation of multiple storage units, and is configured to store executable program code, or parameters, data, and the like that are required for running an application program running apparatus. In addition, the memory 702 may include a random access memory (RAM), or may include a non-volatile memory, for example, a disk storage, or a flash memory.

The bus 704 may be an industry standard architecture ISA) bus, a peripheral component interconnect (PCI) bus, an extended industry standard architecture (EISA) bus, or the like. The bus may be categorized as an address bus, a data bus, a control bus, or the like. For ease of indicating, the bus in FIG. 7 is indicated only by a bold line. However, this does not mean that only one bus or one type of bus exists.

The device may further include an input/output apparatus connected to the bus 704, so that the input/output apparatus is connected to other parts such as the processor 701 by using the bus. A user may implement, by using an input device, a step that requires manual configuration or presetting of parameters in this embodiment. The input/output apparatus may provide an input interface for an operator, so that the operator selects a control option by using the input interface. Alternatively, the input/output apparatus may be another interface, and another external device may be connected by using this interface.

Figure 8:
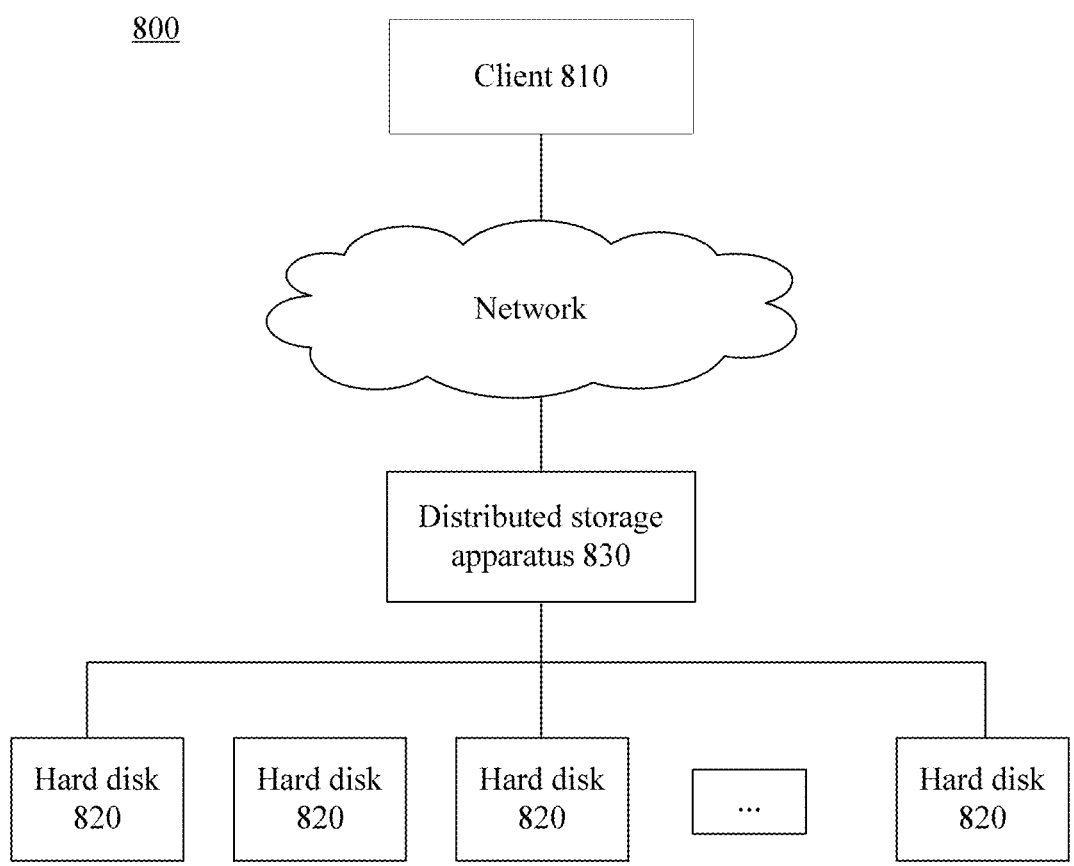
FIG. 8 is a schematic structural diagram of a distributed storage system according to an embodiment of the present invention.

FIG. 8 is a schematic structural diagram of a distributed storage system 800 according to an embodiment of the present invention. The distributed storage system 800 includes a client 810, multiple hard disks 820, and a distributed storage device 830. The distributed storage device 830 may be the distributed storage device 600 or the distributed storage device 700 shown in FIG. 6 or FIG. 7. Details are not described again herein.

For understanding hardware entities in the distributed system provided by this embodiment, refer to the foregoing distributed system architecture in FIG. 1. The distributed database engine 102 in FIG. 1 is not the storage apparatus 830 used as a hardware entity in this embodiment of the present invention. Therefore, in this embodiment, a bearing hardware entity corresponding to the data management module 105 improved in the embodiment of the present invention is the distributed storage apparatus 830.

The distributed storage apparatus 830 stores or reads a data file of a user on multiple hard disks 820 according to a storage/read request sent by the user by using the client 810.

Figure 9:
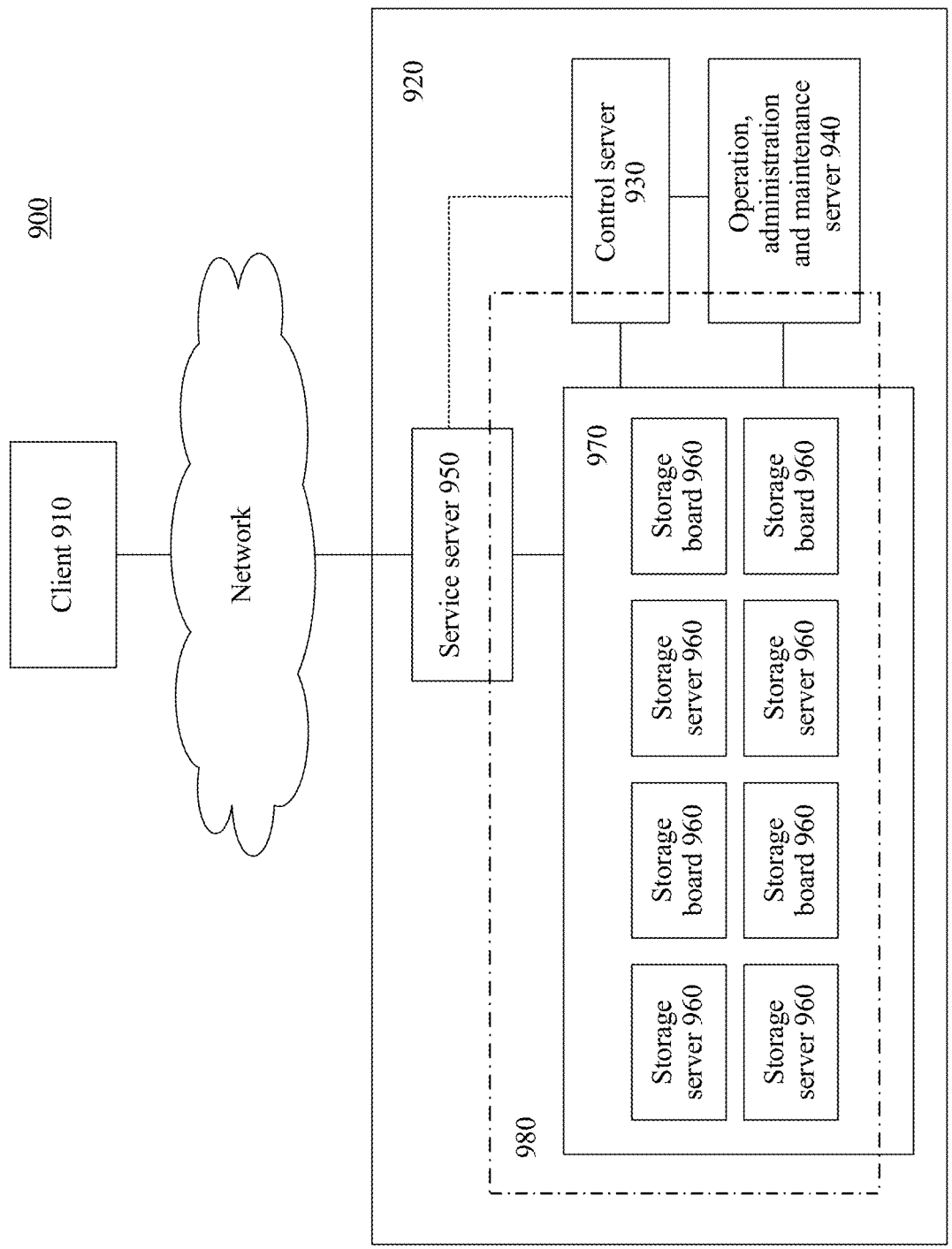
FIG. 9 is a schematic structural diagram of another distributed storage system according to an embodiment of the present invention.

FIG. 9 is a schematic structural diagram of another distributed storage system 900 according to an embodiment of the present invention. The distributed storage system 900 includes a client 910 and a distributed storage server system 920.

The client 910 may be connected to the distributed storage server system 920 by using the Internet.

The client 910 may run a client agent program in the distributed storage system. The client agent program is used to support various distributed storage applications to access the distributed storage system. For example, the client agent program may implement personal online storage and backup, enterprise online storage and backup, application online storage, other emerging storage and backup, or the like.

The distributed storage server system 920 may include a control server 930, an operation, administration and maintenance (OAM) server 940, a service server 950, a storage resource pool 970, and a storage engine 980. Herein the storage engine 980 may be an example of the distributed storage apparatus in FIG. 6 or FIG. 7.

For understanding hardware apparatuses in this embodiment, refer to the foregoing distributed architecture in FIG. 1. The storage engine 980 in this embodiment is used to implement a function of the distributed database engine 102. However, the distributed storage server system 920 further includes other functional servers related to the distributed system, such as the control server 930, the operation, administration and maintenance server 940, and the service server 950.

The control server 930 is mainly configured to control the distributed storage system to perform various storage services, for example, organize data migration, relocation, and backup, and storage hotspot cancellation.

The operation, administration and maintenance 940 may provide a configuration interface and an operation and maintenance interface of the storage system, and provide functions such as logs and alarms.

The service server 950 may provide functions such as service identification and authentication, and complete a service transfer function.

The storage resource pool 970 may include a storage resource pool formed by physical storage nodes, for example, formed by storage servers or storage boards 960. Virtual nodes in each physical storage node form a storage logic ring. A data file of a user may be stored on a virtual node in the storage resource pool.

The storage engine 980 may provide main function logic of the distributed storage system. The logic may be deployed on one device of the control server 930, the service server 950, and the operation, administration and maintenance 940, or may be deployed on the control server 940, the service server 950, the operation, administration and maintenance 940, and the storage resource pool 970. Therefore, an improvement corresponding to the present invention may also be implemented in the foregoing hardware.

Figure 10:
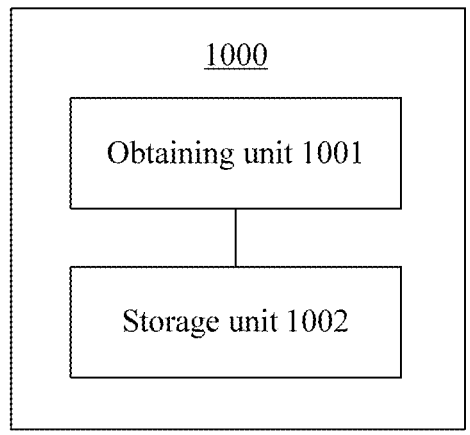
FIG. 10 is a schematic structural diagram of a distributed storage apparatus according to an embodiment of the present invention.

FIG. 10 is a schematic structural diagram of a distributed storage device 1000 according to an embodiment of the present invention. The distributed storage apparatus 1000 includes an obtaining unit 1001 and a storage unit 1002.

The obtaining unit 1001 is configured to determine M storage nodes on which to-be-stored data will be stored, and obtain N replicas of the to-be-stored data, where the N replicas include original data of the to-be-stored data and N−1 pieces of backup data of the original data, and each of the N replicas is sharded into X data shards in a same sharding mode, so that each data shard has N data shard replicas, where N is less than or equal to M. With reference to the method in the first embodiment, a specific manner or an optional implementation in which the obtaining unit 1001 obtains the quantity of the data nodes and obtains the replicas of the to-be-stored data is not described again in this embodiment.

With reference to the foregoing apparatus embodiment, the obtaining unit 1001 may obtain the data from an external network or other devices in a distributed storage system by using the transceiver 603 of the distributed storage apparatus in FIG. 6. Alternatively, the obtaining unit 1001 may include an input/output device, so that the data can be obtained in a manner set by a user. In addition, the obtaining unit 1001 may read a preset value stored in the distributed storage device to obtain the preset numeric value of the data.

Optionally, in this embodiment, the obtaining unit 1001 shards the replicas when obtaining the to-be-stored data. Further, the processor 601 of the distributed storage apparatus in FIG. 6 may be used to invoke the program code stored in the memory 602 to perform the following operation steps to determine the quantity X of the shards: determining an optimal shard base Y of the to-be-stored data according to the quantity N of the replicas and the quantity M of the storage nodes, where the optimal shard base Y is equal to $C_M^N$; and obtaining the quantity X of the shards of the to-be-stored data according to the optimal shard base Y, where the quantity X of the shards of the to-be-stored data is equal to or less than a product of the optimal shard base Y and a coefficient K, and K is an integer greater than or equal to 1.

Optionally, the coefficient K is determined according to a load balancing requirement of the distributed storage system, where the coefficient K is a natural number. When a value of K is greater, a load balancing degree of the to-be-stored data is higher.

Optionally, the quantity X of the shards of the to-be-stored data is determined according to a current load balancing status of the distributed storage system.

The storage unit 1002 is configured to store the to-be-stored data on the M storage nodes of the distributed system. Specifically, a storage policy during storage complies with the following principle: The N data shard replicas of each of the X data shards are respectively stored on N storage nodes in the M storage nodes, and a quantity of data shards whose data shard replicas are stored on same N storage nodes is P or P+1, where P is an integer quotient of X divided by $C_M^N$.

With reference to the foregoing apparatus embodiment, the storage unit 1002 may be implemented by invoking, by using the processor 601 of the distributed storage apparatus in FIG. 6, the program code stored in the memory 602.

For understanding of performing the foregoing steps, refer to the descriptions in the foregoing first or second embodiment. The foregoing steps may also be extended or fractionalized with reference to the foregoing embodiment.

Figure 11:
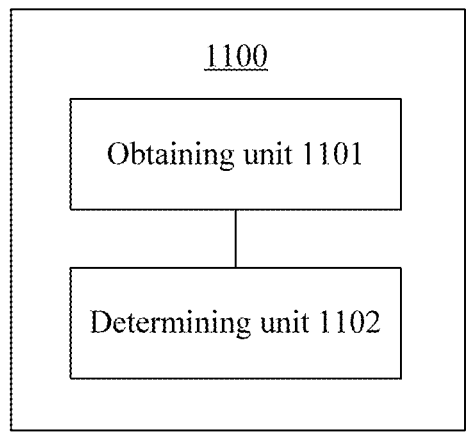
FIG. 11 is a schematic structural diagram of another distributed storage apparatus according to an embodiment of the present invention.

FIG. 11 is a schematic structural diagram of a distributed storage device 1100 according to an embodiment of the present invention. The distributed storage apparatus 1100 includes an obtaining unit 1101 and a determining unit 1102.

The obtaining unit 1101 is configured to obtain M data nodes on which to-be-stored data will be stored, and a quantity N of replicas of the to-be-stored data. A specific manner or an optional implementation in which the obtaining unit 1101 obtains the M storage nodes and the quantity N of the replicas of the to-be-stored data is not described again in this embodiment. For details, refer to the method in the second embodiment.

With reference to the foregoing apparatus embodiment, the obtaining unit 1101 may obtain the data from an external network or other devices in a distributed storage system by using the transceiver 703 of the distributed storage apparatus in FIG. 7. Alternatively, the obtaining unit 1101 may include an input/output device, so that the data can be obtained in a manner set by a user. In addition, the obtaining unit 1101 may read a preset value stored in the distributed storage device to obtain the preset numeric value of the data.

The determining unit 1102 is configured to determines a quantity X of shards of the to-be-stored data, where the quantity of the shards is a quantity of shards that a replica of the to-be-stored data is sharded into, and the quantity X of the shards of the to-be-stored data is equal to or less than $C_M^N$ or equal to or less than a positive integer multiple of $C_M^N$.

Optionally, the determining unit 1102 is further configured to determine a coefficient K according to a load balancing requirement of the distributed storage system, where the coefficient K is a positive integer, a load balancing degree of the to-be-stored data is higher if a value of K is greater, and the quantity X of the shards is equal to or less than $KC_M^N$.

The determining unit 1102 may invoke, by using the processor 701 of the distributed storage apparatus in FIG. 7, the program code stored in the memory 702 to perform the foregoing operation steps to determine the quantity X of the shards.

With reference to the foregoing apparatus embodiment, the determining unit 1102 may be implemented by invoking, by using the processor 701 of the distributed storage apparatus in FIG. 7, the program code stored in the memory 702.

For understanding of performing the foregoing steps, refer to the descriptions in the foregoing first or second embodiment. The foregoing steps may also be extended or fractionalized with reference to the foregoing embodiment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for storing data shards, wherein the method comprises:
   determining M storage nodes on which data will be stored;
   obtaining N replicas of the data, wherein the N replicas comprise original data of the data and N−1 pieces of backup data of the original data, and sharding each of the N replicas into X data shards in a same sharding mode, so that each data shard has N data shard replicas, wherein N is less than or equal to M, and wherein N and M are positive integers, wherein sharding each of the N replicas into X data shards in the same sharding mode comprises:
      determining an optimal shard base Y of the data according to the quantity N of the replicas and the quantity M of the storage nodes, wherein the optimal shard base Y is equal to $C_M^N$, the quantity X of the shards of the data is equal to a product of the optimal shard base Y and a coefficient K, and K is an integer greater than or equal to 1, and
      sharding each of the N replicas into the X data shards in the same sharding mode; or
      determining an optimal shard base Y of the data according to the quantity N of the replicas and the quantity M of the storage nodes, wherein the optimal shard base Y is equal to $C_M^N$,
      obtaining the quantity X of the shards of the data according to the optimal shard base Y, wherein the quantity X of the shards of the data is less than a product of the optimal shard base Y and a coefficient K, and K is an integer greater than or equal to 1, and
      sharding each of the N replicas into the X data shards in the same sharding mode; and
   storing the N replicas of the data on the M storage nodes, wherein the N data shard replicas of each of the X data shards are respectively stored on N storage nodes in the M storage nodes, and a quantity of data shards whose data shard replicas are stored on same N storage nodes is P or P+1, wherein P is an integer quotient of X divided by $C_M^N$, wherein $C_M^N$ is a total number of storage node combinations of selecting N storage nodes from the M data storage nodes.

2. The method according to claim 1, wherein the coefficient K is determined according to a load balancing requirement of a distributed storage system, and a degree of load balancing of the data is higher as the value of K increases.

3. The method according to claim 1, wherein obtaining the quantity N of the replicas of the data specifically comprises:
   determining the quantity N of the replicas of the data according to a security requirement of the data, wherein if the quantity N of the replicas is greater, a higher security requirement of the data can be satisfied.

4. The method according to claim 1, wherein the quantity X of the data shards is determined according to a load balancing requirement of a distributed storage system, and a degree of load balancing of the data is higher as the value of X increases.

5. The method according to claim 1, wherein storing the N replicas of the data on the M storage nodes specifically comprises:
   determining $C_M^N$ data node combinations for selecting N data nodes from the M data nodes when storing the N replicas of the data on the M data nodes;
   determining the quotient P obtained by dividing the quantity X of the shards by $C_M^N$, and a remainder Q; and
   selecting, from the $C_M^N$ data node combinations, Q data node combinations for storing P+1 data shards, and using remaining $C_M^N$−Q data node combinations for storing P data shards, wherein the N replicas of each data shard are respectively stored on N different data nodes in a data node combination.

6. A distributed storage device, wherein the device is used in a distributed storage system comprising at least two storage nodes, and configured to determine a policy for storing shards of data, and the device comprises:
   a memory that stores at least one instruction; and
   a processor coupled with the memory, wherein the processor executes the at least one instruction stored in the memory to perform operations, comprising:
      determining M storage nodes on which data will be stored,
      obtaining N replicas of the data, wherein the N replicas comprise original data of the data and N−1 pieces of backup data of the original data, and sharding each of the N replicas into X data shards in a same sharding mode, so that each data shard has N data shard replicas, wherein N is less than or equal to M, and wherein N and M are positive integers, wherein sharding each of the N replicas into X data shards in the same sharding mode comprises:
         determining an optimal shard base Y of the data according to the quantity N of the replicas and the quantity M of the storage nodes, wherein the optimal shard base Y is equal to $C_M^N$, the quantity X of the shards of the data is equal to a product of the optimal shard base Y and a coefficient K, and K is an integer greater than or equal to 1, and
         sharding each of the N replicas into the X data shards in the same sharding mode; or
         determining an optimal shard base Y of the data according to the quantity N of the replicas and the quantity M of the storage nodes, wherein the optimal shard base Y is equal to $C_M^N$,
         obtaining the quantity X of the shards of the data according to the optimal shard base Y, wherein the quantity X of the shards of the data is less than a product of the optimal shard base Y and a coefficient K, and K is an integer greater than or equal to 1, and sharding each of the N replicas into the X data shards in the same sharding mode, and storing the N replicas of the data on the M storage nodes, wherein the N data shard replicas of each of the X data shards are respectively stored on N storage nodes in the M storage nodes, a quantity of data shards whose data shard replicas are stored on same N storage nodes is P or P+1, wherein P is an integer quotient of X divided by $C_M^N$, wherein $C_M^N$ is a total number of storage node combinations of selecting N storage nodes from the M data storage nodes.

7. A distributed storage system, comprising:

at least two storage nodes; and at least one management device communicatively coupled with the at least two storage nodes, wherein the management device is configured to determine a policy for storing shards of data, and wherein the management device comprises:

a memory that stores at least one instruction, and a processor coupled with the memory, wherein the processor executes the at least one instruction stored in the memory to perform operations, comprising:

determining M storage nodes on which data will be stored, obtaining N replicas of the data, wherein the N replicas comprise original data of the data and N−1 pieces of backup data of the original data, and sharding each of the N replicas into X data shards in a same sharding mode, so that each data shard has N data shard replicas, wherein N is less than or equal to M, and wherein N and M are positive integers, wherein sharding each of the N replicas into X data shards in the same sharding mode comprises:

determining an optimal shard base Y of the data according to the quantity N of the replicas and the quantity M of the storage nodes, wherein the optimal shard base Y is equal to $C_M^N$, the quantity X of the shards of the data is equal to a product of the optimal shard base Y and a coefficient K, and K is an integer greater than or equal to 1, and sharding each of the N replicas into the X data shards in the same sharding mode; or determining an optimal shard base Y of the data according to the quantity N of the replicas and the quantity M of the storage nodes, wherein the optimal shard base Y is equal to $C_M^N$, obtaining the quantity X of the shards of the data according to the optimal shard base Y, wherein the quantity X of the shards of the data is less than a product of the optimal shard base Y and a coefficient K, and K is an integer greater than or equal to 1, and sharding each of the N replicas into the X data shards in the same sharding mode, and storing the N replicas of the data on the M storage nodes, wherein the N data shard replicas of each of the X data shards are respectively stored on N storage nodes in the M storage nodes, a quantity of data shards whose data shard replicas are stored on same N storage nodes is P or P+1, wherein P is an integer quotient of X divided by $C_M^N$, wherein $C_M^N$ is a total number of storage node combinations of selecting N storage nodes from the M data storage nodes.

* * * * *